Dec. 30, 1969 W. J. DRAVING 3,487,188
WELDING METHOD
Filed Feb. 17, 1967
FIG.1.
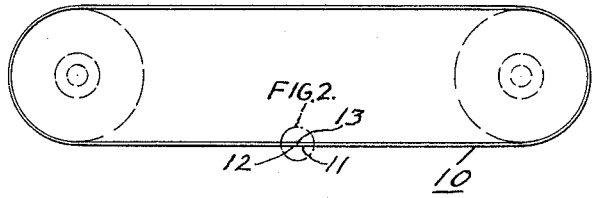
FIG.2.
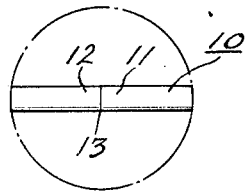
FIG.3
(PRIOR ART)
FIG.4.
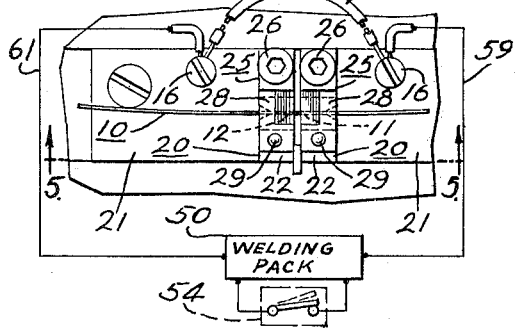
FIG.6.
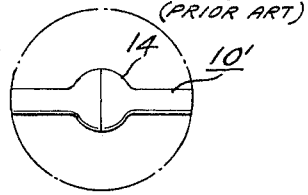
FIG.5.
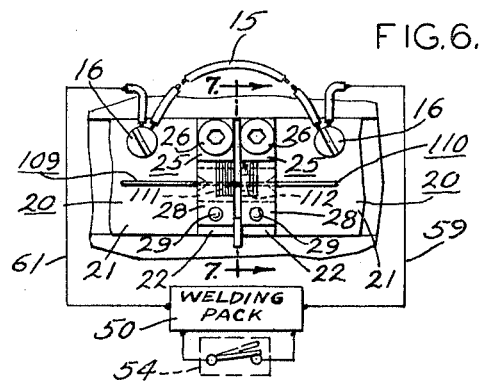
FIG.7.
FIG.8.
FIG.9.
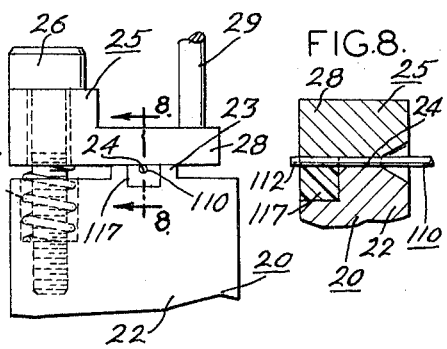
INVENTOR:
WALTER J. DRAVING
BY Howson & Howson
ATTYS.

United States Patent Office 3,487,188
Patented Dec. 30, 1969

3,487,188
WELDING METHOD
Walter J. Draving, Willow Grove, Pa., assignor to Micro-Miniature Parts Corporation, Willow Grove, Pa., a corporation of Pennsylvania
Filed Feb. 17, 1967, Ser. No. 616,864
Int. Cl. B23k *11/04, 11/26*
U.S. Cl. 219—57                           9 Claims

ABSTRACT OF THE DISCLOSURE

This patent relates to a method for butt welding either the terminal ends of a length of wire formed in a loop, one end to the other end, or the terminal ends of separate lengths of wire. In both instances a loop is positioned intermediate the wire holders electrically shunting the capacitive discharge of a capacitive discharge type welding apparatus.

SUMMARY OF THE INVENTION

The present invention relates to a method of butt welding a terminal end of at least one work piece to another terminal end either of the same or another work piece, and more particularly relates to a method of butt welding small diameter wires.

More specifically, the method of the present invention is a method of butt welding a terminal end of at least one work piece to another terminal end in welding apparatus which includes laterally spaced work holders. The method steps comprising: inserting one terminal end of the work piece into one of the holders and inserting the other terminal end into the other holder, moving both of the ends into mutual abutting engagement and electrically shunting the terminal ends; and thereafter applying a low voltage high capacitance between the terminal ends to thereby effect a weld.

STATE OF THE PRIOR ART

Integrated circuit modules are often mass produced in large sheets which require lateral and longitudinal severing in order to obtain the individual circuit modules. In order to separate the modules without damaging them special saws have been designed, similar to a band saw design, with the band saw blade being replaced by a very thin, small diameter wire which is used to sever the modules when used in conjunction with a jeweler's rouge or like compound. These special saw blades are preferably constructed of a Nichrome steel of between .002–.010 inch diameter having its terminal ends joined, usually by a percussion weld, which usually doubles or triples the diameter of the welded joint. If the blade is run at a high speed with an oversized welded joint, the joint creates uneven and jagged edges on the sheet necessitating, in certain instances, discarding of the module. Thus it is necessary, with percussion welded blades, to grind or file the joint to a size substantially the same as the wire diameter. This is a delicate and time consuming task making the manufacture of the blades overly costly. In addition, a percussion weld often tends to create early fatigue of the wire at points adjacent the weld, thus requiring special heat treatment.

DESCRIPTION OF THE INVENTION

In view of the above it is an object of the present invention to provide a novel method of butt welding contiguous wire ends.

Another object of the present invention is to provide a novel method of butt welding contiguous terminal ends of the same or dissimilar wires by bringing the adjacent ends into mutual abutting engagement and electrically shunting the terminal ends prior to applying a low voltage high capacitance to the terminal ends.

Other objects and a fuller understanding of the invention may be had by referring to the following specification and claims taken in conjunction with the accompanying drawings in which:

FIG. 1 is a schematic view of an endless wire mounted on rotating pulleys and acting as a saw blade which blade is manufactured by the method of the present invention;

FIG. 2 is an enlarged view of a portion of the wire illustrated in FIG. 1 and shown enclosed in a circle designated FIG. 2;

FIG. 3 is a view of the saw blade similar to that shown in FIG. 2 but illustrating a welded joint made by the prior art method of percussion welding the terminal ends of he wire;

FIG. 4 is a fragmentary plan view of typical apparatus upon which the method of the present invention may be practiced;

FIG. 5 is a fragmentary sectional view taken along 'ine 5—5 of FIG. 4;

FIG. 6 is a fragmentary plan view of the apparatus shown in FIGS. 4 and 5 in which the terminal ends of separate wire pieces may be butt welded end to end by the method of the present invention;

FIG. 7 is an enlarged fragmentary sectional view taken along line 7—7 of FIG. 6;

FIG. 8 is an enlarged fragmentary sectional view taken along line 8—8 of FIG. 7; and FIG. 9 is a schematic diagram of a welding pack which may be utilized to effect the weld by the method of the present invention and shown in conjunction with the apparatus illustrated in FIGS. 4–8 to effect a weld on the terminal ends of the wire illustrated in FIGS. 1 and 6.

Referring now to the drawings, and particularly FIGS. 1 and 2 thereof, a small diameter wire 10 is formed into a loop with its terminal ends 11 and 12 welded in mutual abutting engagement, end to end, as at a joint 13. FIG. 3 shows the results of the prior art method of connecting the terminal ends of the wire 10' by a percussion weld and illustrates the resulting bulged joint 14 which must be filed or ground to size in order for the joint to be acceptable.

In accordance with the method of the present invention, the terminal ends are inserted into laterally spaced and fixed work holders 20 and the terminal ends are brought into mutual abutting engagement, a loop of wire 15 is then positioned as an electrical shunt, and thereafter a low voltage high capacitance is applied between the terminal ends to effect a weld such as the weld at the joint 13. To this end, typical apparatus for effecting a weld is best illustrated in FIGS. 4, 5, and 7 wherein the work piece holders 20 include laterally spaced base portions 21, each having an upstanding and laterally spaced leg portion 22. As shown, the legs have an upper terminus including a land 23 and a groove 24 therein for receiving respectively the terminal ends of at least one work piece, in the present instance a wire. As illustrated in FIGS. 4 and 5 the grooves 24 are aligned coplanar in both the horizontal and vertical direction to permit accurate alignment of the terminal ends. As best shown in FIG. 7, the work piece holders also include clamping means 25 which is connected to each leg 22 by a cap screw 26 which permits resilient adjustment of the pressure of the clamping means upon the land via a compression spring 27. As shown, the clamping means includes a horizontal extension 28, freely rotatable about the cap screw 26, which when in clamping position, overlies the land 23 and groove 24 so that when a terminal end of a work piece is positioned in the groove 24, pressure is exerted by the underside of the extension 28 upon the terminal end. As illustrated, each of the extensions 28 of the clamping means 25 is provided with upstanding handle means 29 to facilitate rotation of the extension 28 about the cap screw 26.

After the terminal ends 11 and 12 are positioned in the grooves 24 against one another in mutual abutting engagement in the space intermediate the holders 20, it is desirable to couple a welding pack 50 to the terminal ends to effect a current discharge and thereby form a weld at the joint 13. To this end, the holders 20 are preferably composed of a conductive material, such as copper, to permit coupling of the welding pack on a permanent basis to the terminal ends as at the screws 16 where the loop 15 is secured. It should be recognized, however, that clip leads may be provided for connecting the welding pack directly to the portion of the wire adjacent the groove and outwardly therefrom.

Because of the relative simplicity and minimal cost involved, the welding pack 50 is preferably of the capacitive discharge type. Such a capacitive discharge type welding apparatus is illustrated in FIG. 9 and includes, for safety reasons, an isolation transformer 51 which inductively couples AC to its secondary and an autotransformer 52 (or a rheostat) which permits adjustment of the AC voltage to a rectifier 53. Although the rectifier 53 is illustrated as being of the half wave type, it should be recognized that a full wave rectifying bridge may be used in lieu thereof. As shown, the rectifier permits a DC potential to be applied to switching means, in the present distance a double-pole, single-throw switch 54, one pole 54a of which is normally closed, and the other pole 54b of which is normally open. The normally closed portion of the switch 54 connects the rectifier 53 to a bank of capacitors 55 which includes plug-in receptacles 56 and 57 for adding additional capacitance in parallel with the capacitors 55 across the power supply. A voltmeter 58 is connected in parallel with the capacitor bank to afford a convenient method of monitoring the voltage being applied to the pole 54b of the switch 54. The normally open portion of the switch 54b is electrically connected through a lead 59 to the screw 16 of a holder 20 and mechanically connected to a foot switch 60. As noted, the other holder 20 may be grounded as through a lead 61 extending from the other screw 16, as the secondary of the transformer 51, autotransformer 52, and one side of the capacitors are at ground potential.

In operation, with the terminal ends 11 and 12 against one another end to end in mutual abutting engagement, the foot switch 60 may be depressed closing the normally open pole 54b of the switch 54 so as to cause continuity between the capacitors 55 and one of the holders 20. Simultaneously, the other pole 54a is opened, thereby disconnecting the rectifier 53 from the capacitor bank 55. In this manner current flows through the holders 20 and the wire ends 11 and 12 effecting a weld at 13, despite the shunt that is effected between the wire ends by the loop of wire 15.

The reason for the metal flowing at the terminal ends and the current traveling through the junction or joint 13 rather than short circuiting between the holders because of the loop of wire 15, is not understood. Obviously part of the current flow is through the terminal ends effecting the weld, but at least some of the current must flow through the shunt-like loop. When the wire is composed of a Nichrome steel, the loop of wire 15 between the holders will have a finite resistance which when taken in proportion to the resistance at the junction 13 should apparently give some indication of the current flow between the terminal ends and through the shunt-like loop. It is theorized, however, that the inductance of the loop may be one of the predominant reasons for being able to effect the weld by the method of the present invention because the discharging of a capacitor through a small inductance give a pulse which is of a short time duration increasing the impedance of the loop greatly in comparison with the resistance at the junction 13. That the inductance is the more important factor effecting a good weld would appear to be borne out when the wire 15 is composed of a lower resistance material than nichrome steel, such as copper, low carbon steel, etc. At any rate, regardless of the theory, it has been discovered that the existence of the loop shunt does give a weld which is as strong if not stronger than the ultimate tensile stress capabilities of the wire.

As an example of a band saw produced by the method of the present invention, a 74 inch length of .003 inch diameter Nichrome steel was positioned in a loop with the terminal ends in mutual abutting engagement and clamped in the holders 20. The voltage as read on the voltmeter 58 was adjusted to 22–24 volts and the capacitive bank 55 was set at 250 microfarads. Upon depression of the foot pedal an effective weld was created at the junction 13 with no upsetting of the joint. In the present instance, the loop of wire 15 used to shunt the wire 10, comprised a length of Nichrome wire 18" long and .030" in diameter. With the same setup, a .005" diameter Nichrome loop was positioned as above and the voltage was set at 32 volts at a capacitance of 500 microfarads.

In accordance with another feature of the present invention the terminal ends of separate pieces of wire may be positioned in the holders 20, as heretofore set forth, with the terminal end of each wire in mutual abutting engagement with the other, and as before a piece of wire formed in a loop and positioned to electrically shunt the two pieces of wire. When butt welding separate wires by the method of the present invention, the apparatus is identical to the apparatus heretofore described with one exception, which will be discussed more fully hereinafter. Thus, the apparatus illustrated in FIGS. 6 and 7 have been given like numbers for like parts which are identical to the numbers identified in FIGS. 4 and 5 and described above.

In this method, and as best shown in FIGS. 6 and 7, separate wires 109 and 110 are tightly clamped by the clamping means 25 with their terminal ends 111 and 112 in mutual abutting engagement. As before, a loop 15 is connected so as to electrically shunt the holders 20 and thus the welding pack 50. As shown in FIG. 6, the shunt may be connected at the coupling points of the welding pack 50 as by the screws 16. The method thereafter is identical to that above-described with reference to the loop of wire 10.

It was discovered that when welding dissimilar metals by the method of the present invention, for example a copper wire 109 to a steel needle 110, there is a tendency for the higher resistance material such as the steel needle, to partially adhere by a partial weld, to the land 23 of the holder with which it is associated. The partial weld occurs at a point closely adjacent the terminal end 112 of the needle. To alleviate the sticking problem, an insulator 117 is inserted in the land area adjacent the groove 24 and at a point contiguous the terminal end 112 of the projecting needle 110.

As described above with reference to FIG. 9, the method of welding the terminal ends of different wires together may utilize the capacitive discharge welding pack 50.

Typical examples of welds effected by the present invention but connecting the terminal ends of different wires were accomplished by the following procedure: A steel needle .004 inch in diameter was clamped in place in the holder 20 having the insulator and in the position shown in FIG. 6. (the wire 110) A .002 inch diameter copper wire (109) was positioned in the other holder with its terminal end 111 in mutual abutting engagement with the terminal end 112 of the steel needle 110. A 10" shunt 15 of approximately .004 inch diameter copper wire was positioned to shunt the holders 20 and then the foot switch 60 was depressed. The capacitance set on the capacitor bank 55 was 260 microfarads and the voltmeter, prior to depressing the switch 58, read 37 volts.

With the same diameter and material wire 109 and needle 110, and the same voltage and capacitance setup, a different shunt of Nichrome wire was substituted for the copper shunt described above. The Nichrome loop formed was approximately 10 inches in length and it was wound for nine turns on a ½ inch diameter core, the core then being removed. An equally good weld was effected.

Thus the present invention provides a novel method of butt welding contiguous wire ends in end-to-end relation, whether the ends are associated with a single wire or a multiplicity of wires.

Although the invention has been described with a certain degree of particularity, it is understood that the present disclosure has been made only by way of example and that numerous changes in the method of operation may be made without departing from the spirit and the scope of the invention as hereinafter claimed.

What is claimed is:

1. A method of butt welding the terminal ends of at least one work piece in welding apparatus including lateerally spaced work holders; comprising the steps of: inserting one of said terminal ends into one of said holders and inserting said other terminal end into said other holder, positioning said ends in mutual abutting engagement and providing an electrical shunt independent of said workpiece to shunt said terminal ends, and thereafter applying a low voltage high capacitance between said terminal ends while maintaining said shunt to thereby effect a weld.

2. A method of butt welding in accordance with claim 1 wherein said electrical shunting step includes positioning a wire loop connecting said terminal ends.

3. A method of butt welding in accordance with claim 1 wherein a single work piece is formed into a loop, and wherein said insertion step includes inserting one terminal end of said loop into said holder and inserting the other terminal end of said loop into said other holder.

4. A method of butt welding in accordance with claim 1 including the steps of charging said capacitance with a charging means, and disconnecting said charging means and discharging said capacitance through said terminal ends.

5. A method of butt welding in accordance with claim 1 including the step of providing conductive holders, and positioning a wire loop connecting said holders.

6. A method of butt welding at least two work pieces in welding apparatus including laterally spaced work holders; comprising the steps of: inserting one of the terminal ends of one of said work pieces into one of said holders and inserting one of the terminal ends of the other of said work pieces into the other of said holders, positioning said ends in mutual abutting engagement and electrically shunting said terminal ends, and thereafter applying a low voltage high capacitance between said terminal ends while maintaining said shunt to thereby effect a weld.

7. A method of butt welding in accordance with claim 6 wherein said electrical shunting step includes positioning a wire loop connecting said terminal ends.

8. A method of butt welding in accordance with claim 6 including the steps of charging said capacitance with a charging means, and disconnecting said charging means and discharging said capacitance through said terminal ends.

9. A method of butt welding in accordance with claim 6 including the step of providing conductive holders, and positioning a wire loop connecting said holders.

References Cited

UNITED STATES PATENTS

| | | | |
|---|---|---|---|
| 584,120 | 6/1897 | Payne et al. | 219—91 |
| 645,066 | 3/1900 | Brown et al. | 219—117 |
| 2,277,848 | 3/1942 | Delano | 219—57 |
| 2,721,921 | 10/1955 | Sheppard | 219—57 |
| 2,235,385 | 3/1941 | Rava | 219—113 X |

JOSEPH V. TRUHE, Primary Examiner

B. A. STEIN, Assistant Examiner

U.S. Cl. X.R.

219—113, 117, 96